United States Patent Office 3,163,153
Patented Dec. 29, 1964

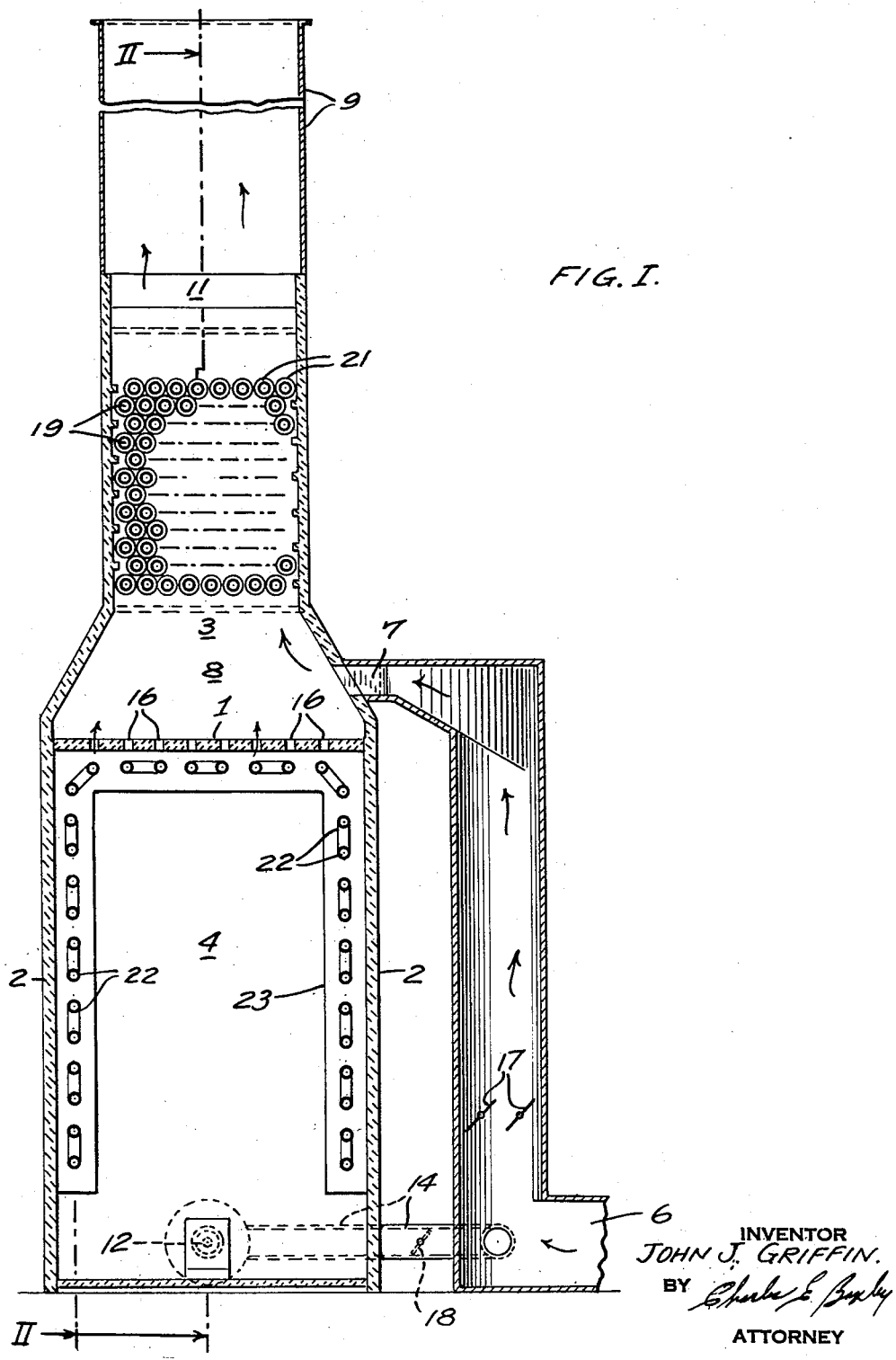
Dec. 29, 1964   J. J. GRIFFIN   3,163,153
WASTE HEAT RECOVERY APPARATUS WITH INTEGRAL FIRED HEATER
Filed March 30, 1962   3 Sheets-Sheet 1
FIG. I.
INVENTOR
JOHN J. GRIFFIN.
BY
ATTORNEY

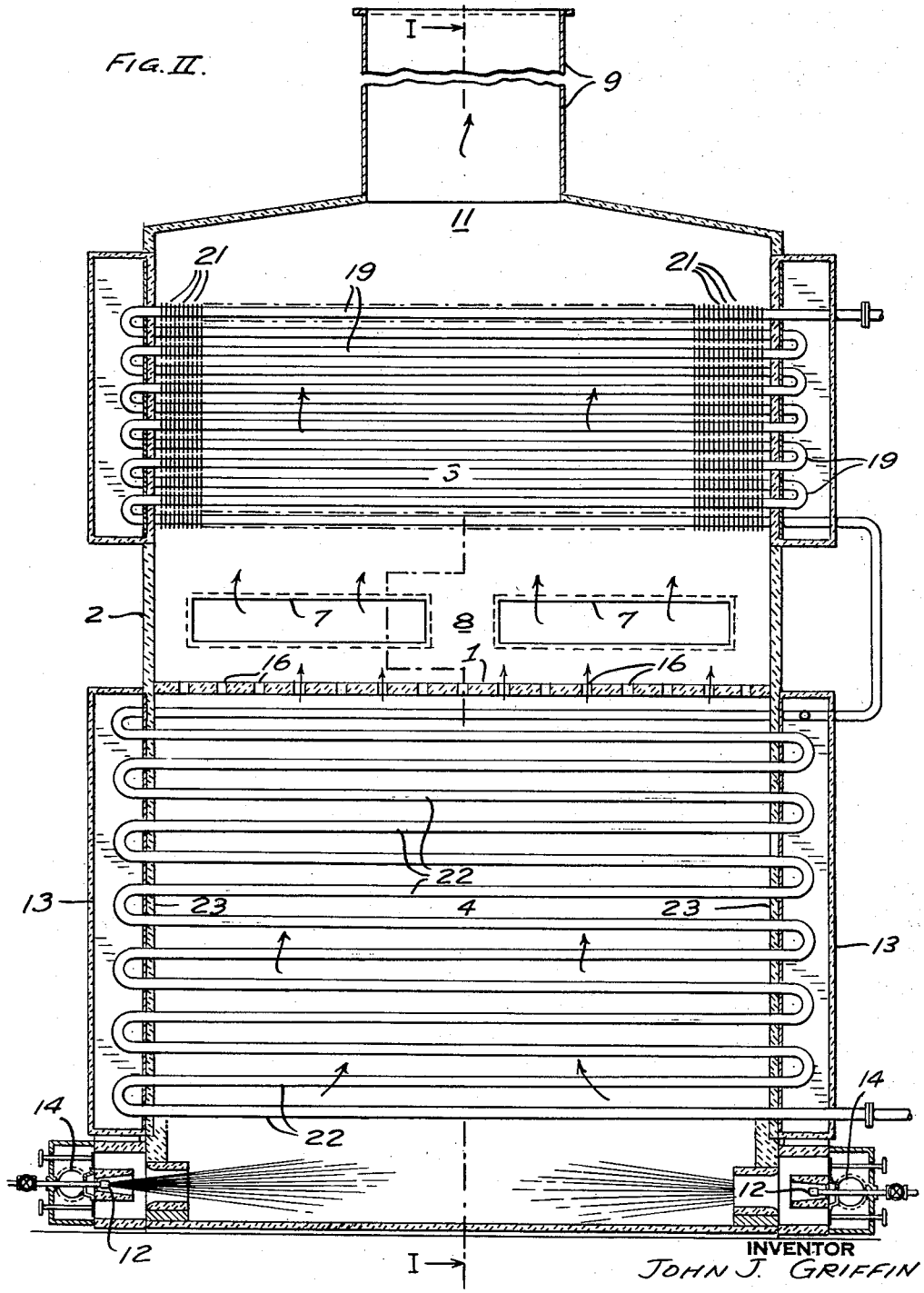

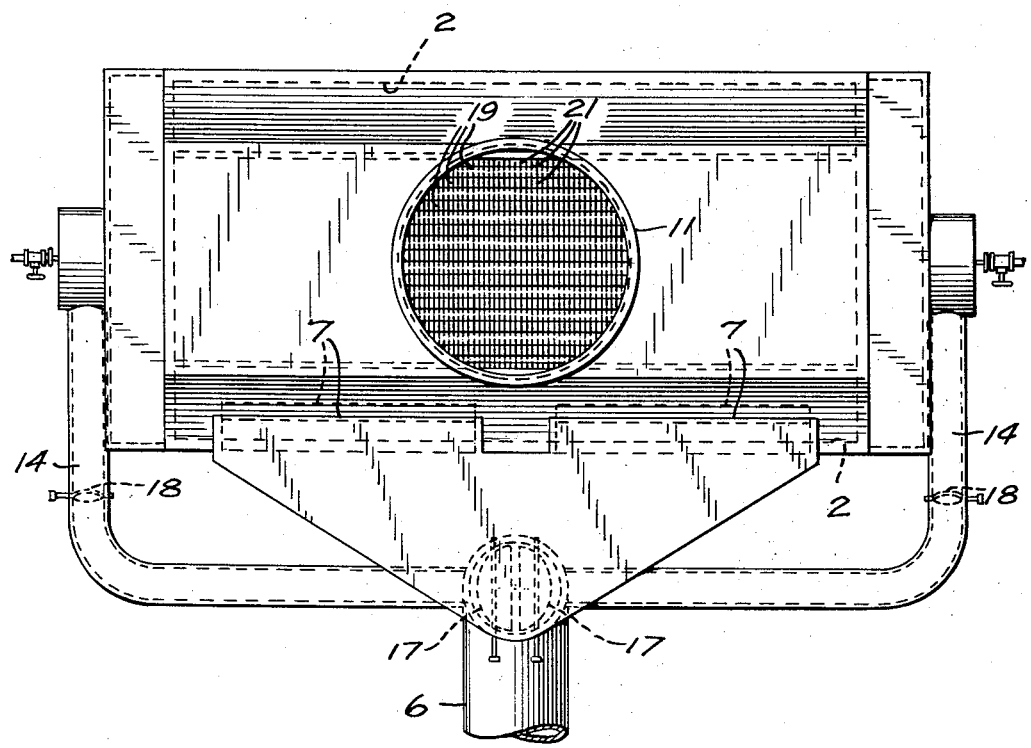
FIG. III.

3,163,153
WASTE HEAT RECOVERY APPARATUS WITH
INTEGRAL FIRED HEATER
John J. Griffin, Huntington, N.Y., assignor to Foster
Wheeler Corporation, New York, N.Y., a corporation
of New York
Filed Mar. 30, 1962, Ser. No. 183,913
1 Claim. (Cl. 122—7)

This invention relates to the recovery of heat from a waste gas. The invention is an integrated waste heat recovery and fired heater apparatus.

Large streams of hot flue gas are common in the process industry. These streams are a potential source of heat, but they are not usually up to the temperature levels required for process streams. Thus heat exchange alone has limited appeal.

Waste heat recovery units are freqeuntly called upon to preheat a process fluid, with further heating accomplished by a fired heater. In such installations, the waste heat recovery unit has been separately housed from the fired heater. Separation was necessary because introduction of two different temperature heating gases in a single chamber resulted in thermal inversion. Descending cooler gases mixed with hoter rising gases. Thus the temperature level of the hotter gas was sacrificed with the consequent disruption of counterflow design.

The present advance teaches a solution to the problem of thermal inversion with at least one waste gas and fired heating employed in a single unit. More particularly, an apparatus is contemplated having a moderate zone and a radiant zone separated by partition means. The moderate zone communicates with a supply of moderately hot gas. Burner means maintain combustion in the radiant zone at temperatures higher than that of the gas in the moderate zone. Thermal inversion between the gases in the moderate zone and hotter gases in the radiant zone is prevented by the partition means. The partition means also defines at least one orifice communicating the radiant zone with the moderate zone. Means are provided to furnish a pressure gradient across the orifice from the radiant zone to the moderate zone so that combustion gases exit from the radiant zone via the moderate zone.

Basically the integration of a moderate zone in a fired heater allows this apparatus to recover heat from whatever hot or moderately hot waste gases are available as well as to accomplish fired heating which can attain the higher temperature levels demanded by industry. Practical design possibilities for including heat recovery from waste gases are vastly broadened. Please also bear in mind that any reasonably hot and otherwise manageable gas can be introduced into the moderate zone. Further, practically any type of fuel may be burned in the radiant zone.

This apparatus also offers low initial plant costs over a separate waste heat recovery unit serially arranged with a fired heater. Fuel requirements are reduced from these of a fired heater operating only one flue preheating.

Waste Gases Containing Oxygen

Another dimension is added to this invention by its adaptibility to hot gases with enough oxygen to support combustion.

Various flue gases, such as the exhaust from a gas turbine, containing enough oxygen to support combustion. Oxygen contents in the range of thirteen to nineteen percent by volume are not uncommon. Such hot oxygen-rich gases offer an opportunity to increase the efficiency of combustion in the radiant zone of this apparatus. Toward this end, a hot oxygen-rich gas can be introduced into the radiant zone to support the combustion of a suitable fuel therein. Any otherwise suitable waste gas (not necessarily oxygen-rich) may be advantageously employed in the moderate zone.

Detailed Description

These and other advantages will appear more fully from the following description viewed in conjunction with the accompanying drawings wherein:

FIGURE I is a sectional elevation of a heater embodying this invention and taken along line I—I of FIGURE II.

FIGURE II is a sectional elevation of the heater taken along line II—II of FIGURE I.

FIGURE III is a plan view of the heater.

In the drawings, partition means shown as horizontal deck 1 divides setting 2 into upper moderate zone 3 and lower radiant zone 4.

Heat may be recovered from any available waste gas in moderate zone 3. In the shown embodiment, first conduit 6 delivers to moderate zone 3 a major portion of the discharge from a gas turbine (not shown). This particular waste gas happens to be rich in oxygen, but a high oxygen content is not necessary for heating service in moderate zone 3. Generally any otherwise suitable moderately hot gas in the range of from 700 to 1100° F. may be used for heat exchange service in moderate zone 3. Moderately hot gas is delivered to horizontal gas distributor 7 communicating with lower portion 8 of moderate zone 3. The flow of gas through moderate zone 3 is to be upward to stack 9 in upper portion 11. Stack 9 serves as an exhaust means for removing gases from moderate zone 3.

Combustion in radiant zone 4 sustains the temperature of that zone higher than the temperature of the moderately hot gas. Burner means are shown to include burner nozzles 12 penetrating radiant zone 4 via end walls 13. In the shown arrangement a minor portion of the oxygen-rich waste gas discharge from the gas turbine is communicated via second conduits 14 to mix with and support the combustion of fuel delivered through burner nozzles 12 from a source of gaseous fuel (not shown). Temperatures in excess of 1500° F. are preferred in radiant zone 4, although lower temperatures could also be used.

Deck 1 prevents thermal inversion between moderately hot gas in moderate zone 3 and the higher temperature combustion gases in radiant zone 4.

Combustion gases exit from radiant zone 4 through restricted orifices 16 formed in deck 1 via moderate zone 3 and stack 9.

To accommodate the removal of combustion gases, means are provided to furnish a pressure gradient across the orifices from radiant zone 4 to moderate zone 3. In the shown arrangement, first dampers 17 are operatively arranged in first conduit 6 so that the pressure in moderate zone 3 is below two inches of water. Second dampers 18 are operatively arranged in second conduits 14 so that the pressure in radiant zone 4 is maintained above four inches of water. Restricted orifices 16 are each constructed and arranged so that they require a pressure drop of less than two inches of water to pass the combustion gases from the fired zone therethrough.

Heat extraction up to a moderate level can be accomplished in moderate zone 3. Radiant zone 4 is generally employed to attain high outlet temperatures for a process stream. Preheat tube 19 with extended surfaces 21 is shown in moderate zone 3. High level heat tube 22 is shown mounted by collar 23 in radiant zone 4. High heat tube 22 is connected downstream of preheat tube 19.

It will be apparent to those skilled in fired heater designs that wide changes may be made in the details of the shown embodiment without departing from the scope of invention defined by the claim.

What is claimed is:

An apparatus comprising a vertical setting which defines a chamber, a substantially horizontal deck in the chamber describing an upper moderate temperature zone and a lower radiant zone therein, a source of waste heat gas, means for communicating the moderate temperature zone with said source and also the bottom of the radiant zone with said source, exhaust means communicating with the moderate temperature zone to remove gases therefrom, burner means operatively associated with the radiant zone to maintain combustion therein at a higher temperature than that of the waste heat gas, the deck comprising a refractory, said refractory deck defining a plurality of restricted orifices spaced thereover and communicating the radiant zone with the moderate temperature zone, the refractory shielding the moderate temperature zone from radiant heat, means for establishing a pressure gradient across the orifices from the radiant zone to the moderate temperature zone so that combustion gases exit from the radiant zone via the moderate temperature zone and the exhaust means, at least one preheat tube mounted in the moderate temperature zone, means for passing a process fluid through the preheat tube for non-contact heat exchange with the waste heat gas and the combustion gases therein, at least one high heat tube mounted in the radiant zone, means for passing the process fluid through the high heat tube for non-contact heat exchange with the combustion gases therein, the high heat tube connected serially downstream of the preheat tube, the moderate temperature zone having a lower portion and an upper portion, the preheat tube mounted in the upper portion, the waste heat gas being introduced into the lower portion, the lower portion comprising a mixing chamber for the flow of gases from the radiant zone and the waste heat gas, the exhaust means being above the upper portion.

References Cited in the file of this patent

UNITED STATES PATENTS

| | | |
|---|---|---|
| 2,147,609 | Reed et al. | Feb. 14, 1939 |
| 2,336,833 | Badenhausen | Dec. 14, 1943 |
| 2,361,812 | Barnes | Oct. 31, 1944 |
| 2,825,311 | Smith | Mar. 4, 1958 |
| 2,869,519 | Schroedter et al. | Jan. 20, 1959 |

FOREIGN PATENTS

| | | |
|---|---|---|
| 774,799 | Great Britain | May 15, 1957 |
| 1,228,730 | France | Sept. 2, 1960 |